United States Patent [19]

Gibbs et al.

[11] Patent Number: 4,748,656
[45] Date of Patent: May 31, 1988

[54] PERSONAL COMPUTER—AS AN INTERFACE BETWEEN A TELEPHONE STATION SET AND A BUSINESS COMMUNICATION SYSTEM

[75] Inventors: David C. Gibbs, Broomfield; Norman W. Petty, Boulder, both of Colo.

[73] Assignee: American Telephone and Telegraph Company and AT&T Information Systems Inc., Holmdel, N.J.

[21] Appl. No.: 842,685

[22] Filed: Mar. 21, 1986

[51] Int. Cl.⁴ .......................................... H04M 11/00
[52] U.S. Cl. ...................................... 379/93; 379/96; 379/94; 364/900
[58] Field of Search ................. 379/93, 94, 96, 90, 379/97, 98; 364/200, 900

[56] References Cited

U.S. PATENT DOCUMENTS

| | | | |
|---|---|---|---|
| 4,112,258 | 9/1978 | Alles | 179/15 AT |
| 4,330,886 | 5/1982 | Fukuda et al. | 379/93 X |
| 4,375,582 | 3/1983 | Gist et al. | 379/96 |
| 4,387,440 | 6/1983 | Eaton | 379/94 X |
| 4,475,189 | 10/1984 | Herr et al. | 379/93 X |
| 4,481,574 | 11/1984 | DeFino et al. | 379/93 |
| 4,503,288 | 3/1985 | Kessler | 379/96 X |
| 4,524,244 | 6/1985 | Faggin et al. | 379/93 |
| 4,532,377 | 7/1985 | Zink | 379/94 |
| 4,534,023 | 8/1985 | Peck et al. | 370/58 |
| 4,535,198 | 8/1985 | Squicciarini | 179/2 DP |
| 4,640,989 | 2/1987 | Riner et al. | 379/96 X |

FOREIGN PATENT DOCUMENTS 60-154767 8/1985 Japan .

OTHER PUBLICATIONS

BIZCOMP, brochure: "There's Only One PC/XT Modem Designed to Let Both You and Your Computer Talk on the Same Line", modem introduced in 1983.
N. Accarino et al., entitled "Frame-Mode Customer Access to Local Integrated Voice and Data Digital Network", published in the Conference Report of the IEEE 1979 International Conference on Communications, pp. 38.5.1–38.5.7.

Primary Examiner—Jin F. Ng
Assistant Examiner—Matthew E. Connors
Attorney, Agent, or Firm—David Volejnicek; James M. Graziano

[57] ABSTRACT

This invention is an interface arrangement which interconnects a business communication system with a telephone station set. This interface is implemented in a personal computer which serves to control the operation of the associated telephone station set and also provide business communication services. All signaling from the business communication system is received by the personal computer, interpreted, and appropriate control signals are then forwarded under control of the software resident on the personal computer to activate the digital telephone station set. The signals from the digital telephone station set are intercepted by the personal computer, interpreted, modified and appropriate control messages and signaling are then forwarded by the personal computer to the business communication system.

This arrangement enables a user to create software on the personal computer to control the operation of the telephone station set associated with the personal computer. The user can implement new features and services independent of the operation of the business communication system.

39 Claims, 8 Drawing Sheets

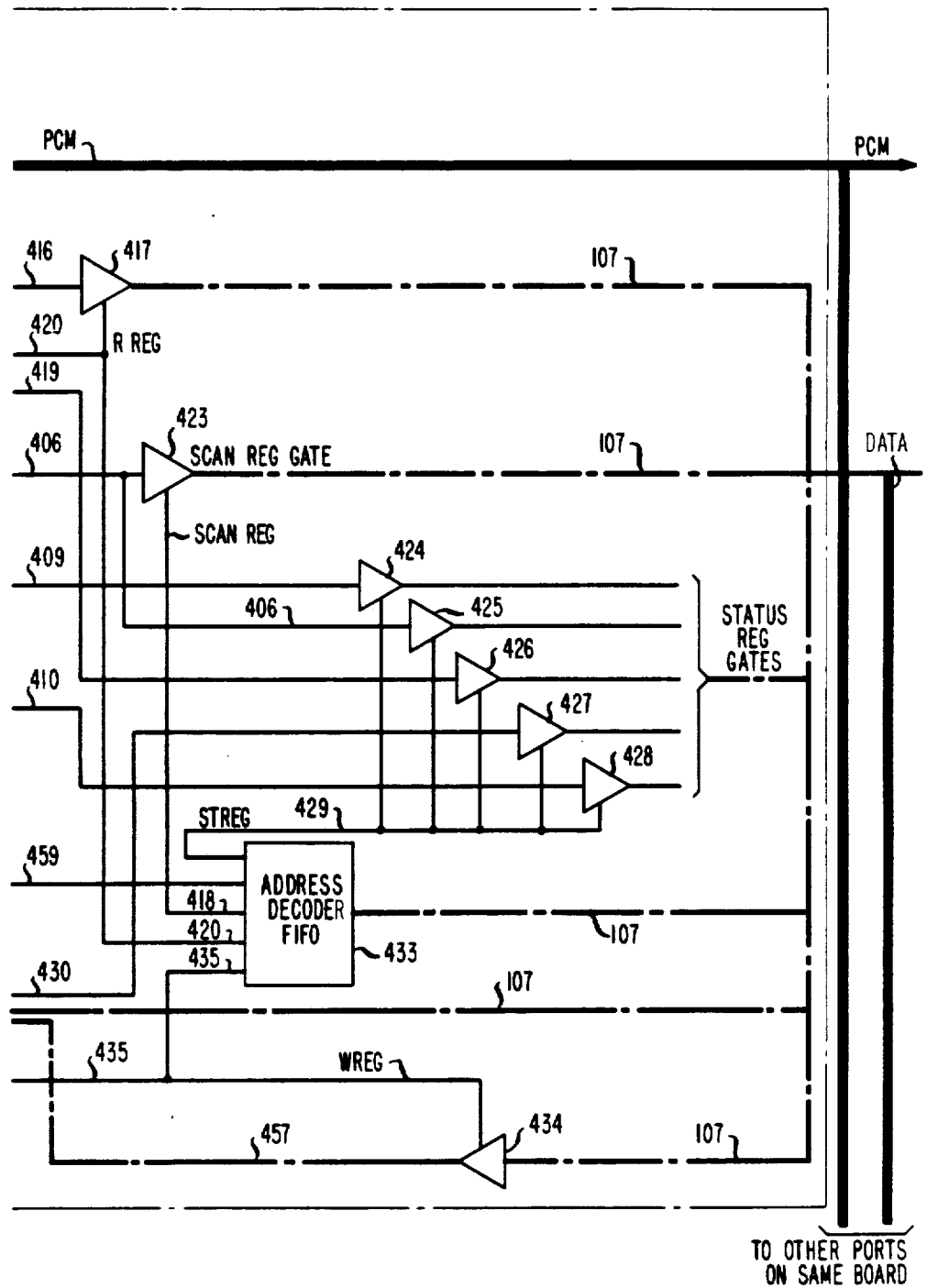

FIG. 8
DCP FRAME FORMAT

| F<br>3 BITS | S<br>1 BIT | $I_1$<br>8 BITS | $I_2$<br>8 BITS |
|---|---|---|---|

FIG. 9
HDLC FRAME FORMAT

| FLAG<br>01111110<br>1 BYTE | ADDRESS<br>1 BYTE | CONTROL<br>1 BYTE | I<br>INFORMATION<br>0-16 BYTES | CHECK<br>SEQUENCE<br>2 BYTES | FLAG<br>01111110<br>1 BYTE |
|---|---|---|---|---|---|

PERSONAL COMPUTER—AS AN INTERFACE BETWEEN A TELEPHONE STATION SET AND A BUSINESS COMMUNICATION SYSTEM

CROSS-REFERENCE TO RELATED APPLICATIONS

The following U.S. applications, which are assigned to the same assignee as the instant application and filed concurrently therewith, have related subject matter:

(1) "Automated Message Chronicing System", Ser. No. 842,601, filed Mar. 21, 1986 by J. W. Bourg.

(2) "Integrated Calling Directory", Ser. No. 842,682, filed Mar. 21, 1986 by J. W. Bourg and T. J. Tierney, Jr.

FIELD OF THE INVENTION

This invention is an interface arrangement which interconnects a business communication system with a telephone station set. This interface circuit is implemented by a personal computer which serves to control the operation of the associated telephone station set and provide business communication services.

BACKGROUND OF THE INVENTION

Stored program controlled telephone switching systems are used to interconnect telephone station sets as well as digital terminals, personal computers and large mainframe computers. The telephone switching system establishes data communication connections between computer facilities in a manner analogous to voice communication connections between subscribers using analog telephone station sets. Each of the computer facilities are connected to an associated communication pair of the telephone switching system by a modem. A standard telephone station set is also connected to the communication pair and is used to originate a call to a destination computer facility. As a result of the call origination, a communication connection is established through the telephone switching network from the originating telephone station set to the destination computer facility. The user then switches the modem on line and the modem converts the digital signals output by the computer facility to analog signals which are transmitted by the switching network to a modem associated with the destination computer facility. The destination modem converts the received analog signals to digital signals for use by the destination computer facility. Thus, the telephone station set is used for call origination purposes so that the computer at the originating location can be connected to the telephone lines.

An alternative arrangement is where the computer facility is directly connected to the communication pair through an interface circuit and the computer facility emulates the functions of the telephone station set. In this case, the originating computer usually displays the telephone station set buttons and key pad on the screen of the video display terminal (VDT) associated with the computer facility. The user can use the cursor on the VDT to select various telephone station set buttons displayed on the VDT so that the associated telephone function can be activated. The computer responds to the cursor movement by emulating the telphone station set function identified by the user. In this fashion, the digital telephone station set is no longer needed for call origination purposes. The computer facility can perform all the functions previously associated with the adjunct telephone station set.

Neither of these prior art arrangements provide communication services on the computer system for the associated telephone station set. The telephone and computer functions are independent and mutually exclusive.

SUMMARY OF THE INVENTION

The interface arrangement of the subject invention interconnects a business communication system with a telephone station set and provides communication services for the telephone station set on an associated personal computer. An interface board is plugged into an expansion slot on a personal computer and is also connected to any digital telephone station set as well as the communication leads from the business communication system. This interface board interposes the personal computer between the business communication system and the digital telephone station set. All signaling from the business communication system is received by the personal computer, interpreted, and appropriate control signals are then forwarded under control of the software resident on the personal computer to activate the digital telephone station set. The signals from the digital telephone station set are intercepted by the personal computer, interpreted, modified and appropriate control messages and signaling are then forwarded by the personal computer to the business communication system.

This arrangement enables a user to create software on the personal computer to control the operation of the telephone station set associated with the personal computer. The user can implement new features and services independent of the operation of the business communication system.

In addition, the interface board can be used in a stand-alone mode to function as a data module or a repeater in the case where the telephone station set is located a significant distance from the business communication system. The interface board replicates the received voice signals and transmits the new signals to the telephone station set.

BRIEF DESCRIPTION OF THE DRAWING

FIGS. 4 through 6 depict the details of the business communication system port circuit;

FIG. 7 illustrates the method of arranging FIGS. 4 through 6;

FIG. 8 depicts the details of the DCP signaling protocol;

FIG. 9 depicts the details of the HDLC message frame; and

DETAILED DESCRIPTION

Figure 1:
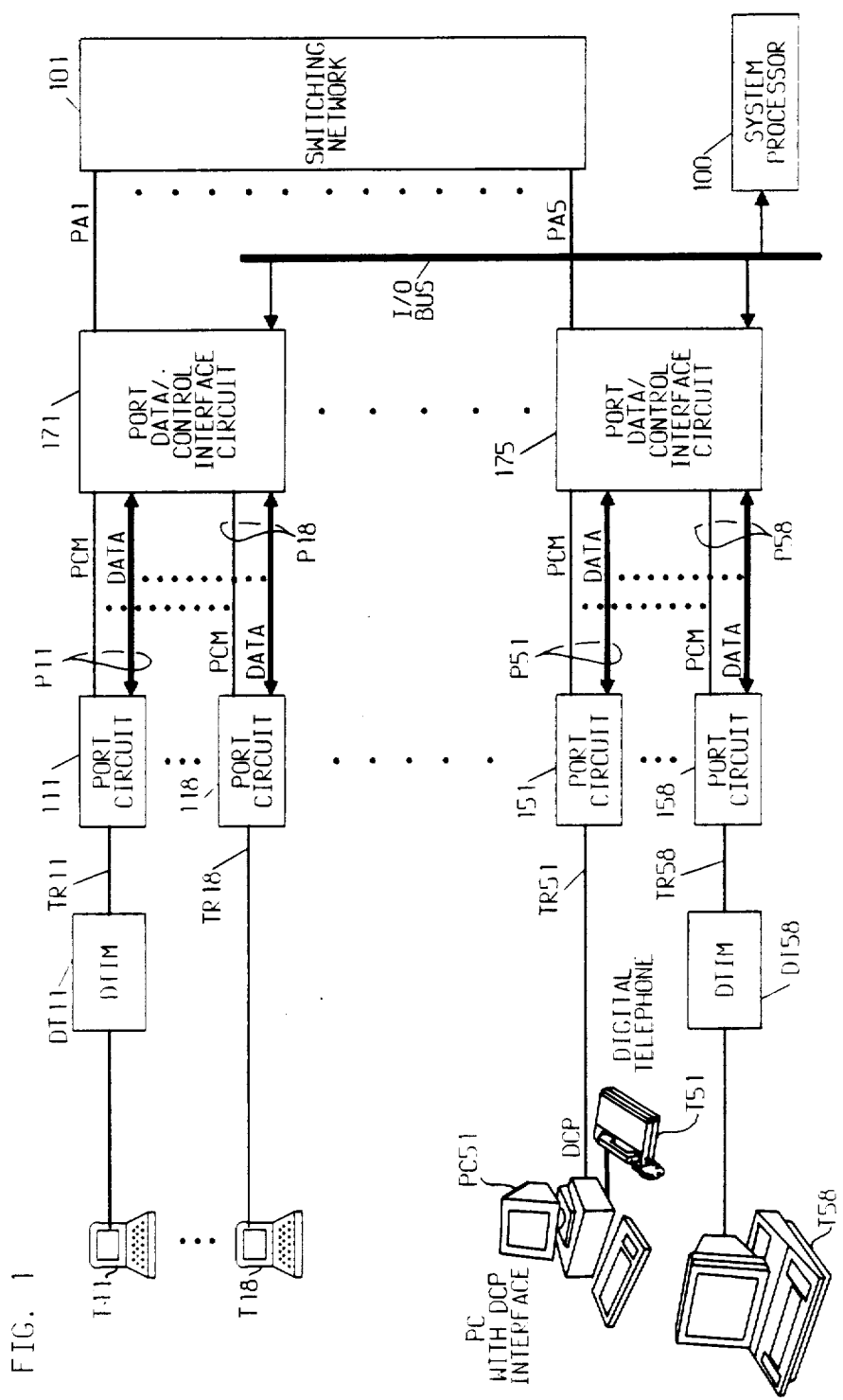
FIG. 1 illustrates the subject business communication system and the various devices connected thereto in block diagram form.

The business communication system of this invention is illustrated in FIG. 1. This system includes a plurality of terminal equipment T11-T58 each of which is associated with a respective one of port circuits 111-158. This terminal equipment includes telephone station sets as well as digital terminal devices and computer facilities. A switching network 101, which comprises a time slot intrechange circuit of the type illustrated in U.S. Pat. No. 4,112,258, issued to H. G. Alles, Sept. 5, 1978, is connected to a number of port data/control interface circuits 171-175. Each port data/control interface circuit (eg. 171) shown in FIG. 1 serves eight port circuits (111-118) and functions to interface these port circuits with switching network 101 as well as system processor 100. Switching network 101 operates under control of system processor 100 and establishes communication connections among the terminal equipment by interconnecting the associated port circuits 111-158.

Figure 2:
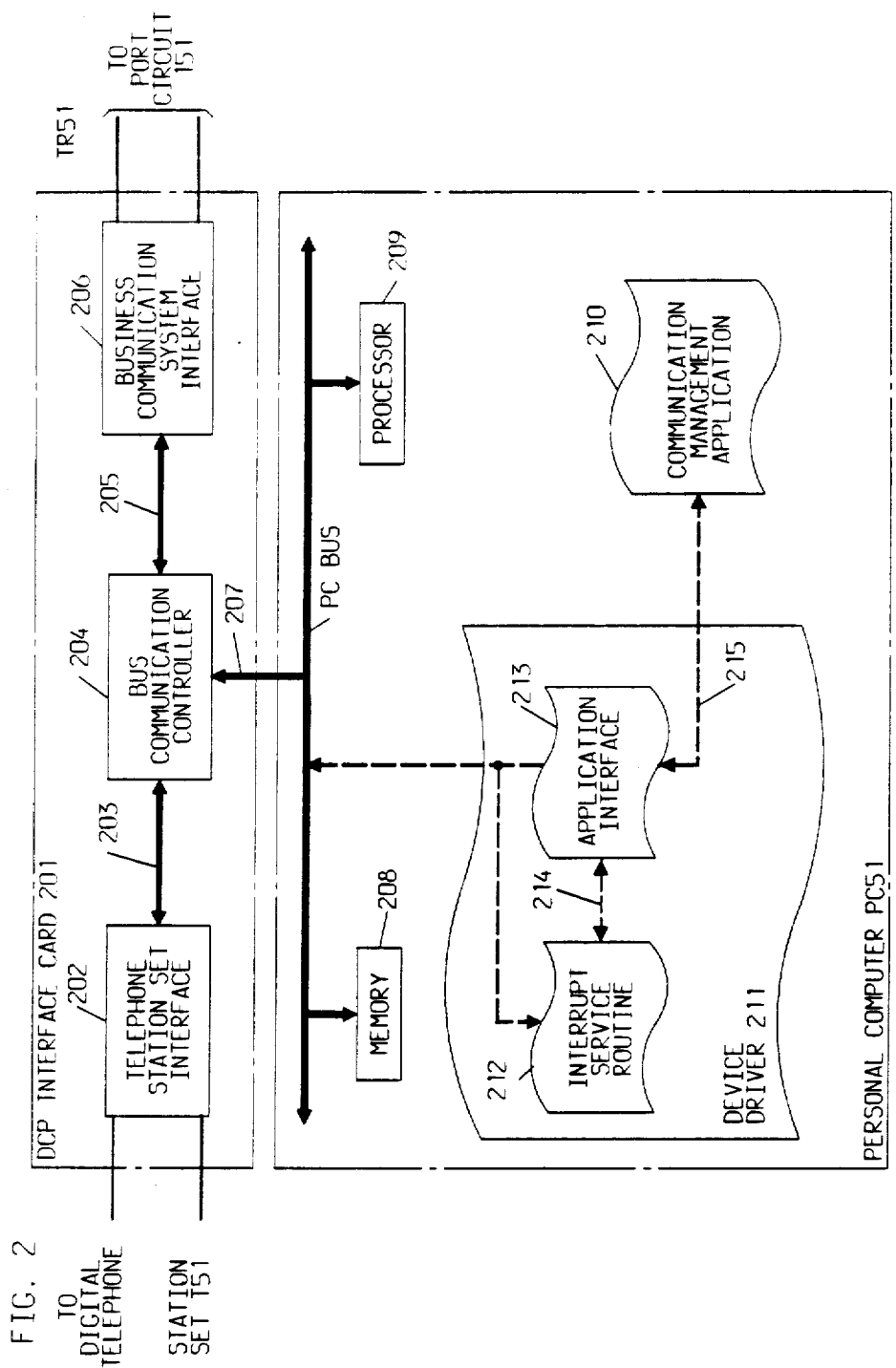
FIG. 2 illustrates the interface apparatus of the subject invention in block diagram form.

The terminal equipment connected to port circuit 151 consists of the subject interface arrangement embodied in personal computer PC51 which is equipped with a DCP interface card and a digital telephone station set T51. Personal computer PC51 is interposed between port circuit 151 and digital telephone station set T51 and serves to provide communication services to digital telephone station set T51. This is accomplished by the use of DCP interface card 201 shown in block diagram form in FIG. 2.

DCP Interface Card

DCP interface card 201 is plugged into one of the expansion slots of personal computer PC51, where personal computer PC51 can be, for example, an AT&T PC6300 computer. DCP interface card 201 consists of two interface devices, telephone station set interface 202 and business communication system interface 206, which interconnect personal computer PC51 to digital telephone station set T51 and port circuit 151 respectively. Leads 203 and 205 connect telephone station set interface 202 and business communication system interface 206 respectively to bus communication controller 204.

DCP interface card 201 receives all transmissions from port circuit 151 in business communication system interface 206 via communication leads TR51. Bus communication controller 204 receives an interrupt signal from business communication system interface 206 via leads 205 and reads the transmissions from port circuit 151 stored in business communication system interface 206. Bus communication controller 204 responds to these transmissions by generating an interrupt signal on PC BUS 207 personal computer PC51. Personal computer PC51 serves the interrupt by reading the transmission stored in bus communication controller 204 via PC BUS 207, and storing the transmission in memory 208. Personal computer PC51 contains communication management application 210 to process the received transmission from port circuit 151. Device driver 211 interfaces communication management application 210 with DCP interface card 201. Device driver 211 contains two basic components: interrupt service routine 212 and application interface process 213. The functions of device driver 211 are: process interrupts from DCP interface card 201; buffer and transfer data between DCP interface card 201 and communication management application 210; provide a simple interface to communication management application 210 for basic call setup and data transfer; and handle data call setup procedures with the business communication system, as will be discussed below.

If the processing of the received transmission requires a change in the status of digital telephone station set T51, processor 209 transmits control signals to bus communication controller 204 via PC BUS 207. These control signals are forwarded by bus communication controller 204 to digital telephone station set T51 via leads 203 and telephone station set interface 202.

Transmissions from digital telephone station set T51 to port circuit 151 are handled in similar fashion, with the above described process being reversed. The operation of DCP interface card 201 and communication management application 210 is described in further detail below in the description of FIG. 3. To provide an explanation of the DCP signaling protocol, the following description discusses a typical port circuit and the functions performed therein.

Terminal Equipment

The standard digital terminal T11 generates an RS232 signal output which has a very limited transmission range. A digital terminal interface module (e.g.—DT1-1)is used to convert the RS232 signals output by digital terminal T11 to alternate bipolar modulated code signals which can be transmitted a significant distance over communication leads TR11 to the port circuits 111 of the business communication system. The digital terminal interface module DT11 is either an integral part of the digital terminal or connected between the existing digital terminal T11 and the associated communication leads TR11. This digital terminal interface module is disclosed in detail in U.S. Pat. No. 4,535,198 issued Aug. 13, 1985, to G. N. Squicciarini.

In addition to this signal conversion, digital terminal interface module DT11 uses a particular message frame format (DCP) to effect data transmission between port circuits such as 111 and thei associated digital terminals such as T11. This DCP format consists of a framing bit and three fields: an S field that conveys control signaling data, and two I fields that convey information data (FIG. 8). This is a well-known data transmission format as described in the article by N. Accarino et al. entitled, "Frame-Mode Customer Access to Local Integrated Voice and Data Digital Network" published in the Conference Report of the IEEE 1979 International Conference on Communications. In this DCP data transmission format, one of the I fields can be used for the transmission of PCM-encoded voice information while the other one (or both I fields) can be used for the transmission of either bulk or interactive data.

Message Format

The terminal equipment served by the business communication system may be various types of equipment, and the terminal equipment illustrated in FIG. 1 has concurrent voice and data transmission capability. In this system, all the terminal equipment which receives voice transmissions from the user converts the received analog voice signals into a set of digital data segments, each comprising an eight bit PCM-encoded voice sample. The terminal equipment which generates digital transmissions (such as keyboards) receives and originates digital data messages which are generally of length greater than eight bits. A typical format (HDLC) of these data messages is illustrated in FIG. 9, wherein each data message includes flag characters at the beginning and end of the data message; data, control and address fields; and a cyclic redundancy check field for error checking purposes.

Signaling Channels

This business communication system is equipped with two signaling channels which reflect the basic DCP message frame format used by the port circuits. In particular, a control signaling channel (S channel) conveys control message (S field bits) between system processor 100 and digital terminals T11-T58. The S channel extends from each digital terminal (such as T11) through associated digital terminal interface module (DTIM) DT11, communication leads TR11, port circuit 111, leads P11 and thence through port data/control interface circuit 171 to system processor 100 via I/O BUS. The business communication system is also equipped with an information channel (I channel) which conveys information data (I field segments) such as the eight-bit PCM-encoded voice signals or bulk data (in eight-bit bytes) between switching network 101 and digital terminals T11-T58. The I channel extends from each digital terminal (such as T11) through associated digital terminal interface module (DTIM) DT11, communication leads TR11, port circuit 111, leads P11 and thence through port data/control interface circuit 171 to switching network 101 via leads PA1.

Thus, the digital terminal and its associated digital terminal interface module multiplex the actual data transmissions (voice and data) with the control signals. This multiplexed signal is then transmitted over the communication leads to the associated port circuit where it is demultiplexed. The actual data transmission is switched in traditional fashion by switching network 101 to the designated destination and the control signals are forwarded to system processor 100. Again, these control signals are the standard on-hook/off-hook status, button operation, lamp lighting, and ringing signals common to all telephone switching systems. To effectively illustrate the structure and operation of the subject interface arrangement, the details of the existing port circuit and especially the S channel must first be explored.

I Channel Realization

System processor 100, in the course of connecting a calling digital terminal (T11) to a called digital terminal (T58), assigns a time slot in switching network 101 for the interconnection of digital terminals T11 and T58. Switching network 101 controls the data (I channel) transmissions between digital terminals T11-T58. In particular, switching network 101 transmits each eight bit data segment received from digital terminal T58 to port circuit 111 via port data/control interface circuit 175. Port circuit 111 transmits each data segment so received to digital terminal T11 via digital terminal interface module (DTIM) DT11 and also receives a reply data segment from digital terminal T11 via DTIM DT11 for transmission to digital terminal T58. Port circuit 111 transmits the replay data segment received from DTIM DT11 to switching network 101 via port data/control interface circuit 171. Switching network 101 stores the received data segment, and interchanges the data segments received from digital terminal T11 and digital terminal T58 during the time slot assigned for this call. This action interconnects these digital terminals.

S Channel Realization

The control or S channel transmissions are controlled by system processor 100. System processor 100 periodically scans each port, trunk and service circuit connected to switching network 101 to find if there is a control message for system processor 100. During each such scan cycle, system processor 100 transmits timing, address and control information to port data/control interface circuits 171-175 via I/O BUS. Each port data/control interface circuit (ex. 171) has a multiplexer which interprets the signals received on I/O BUS during each scan cycle and determines whether the address signals transmitted thereon identify one of the port circuits (e.g. 111) served by that port data/control interface circuit (171). If such a match occurs during a scan cycle, port data/control interface circuit 171 enables the identified port circuit 111 to read the control message transmitted to port data/control interface circuit 171 by system processor 100.

Port circuit 111 reads the control message written into port/data control interface circuit 171 by system processor 100 and places the control message into a control message register (not shown) in port circuit 111. Port circuit 111 transmits this control message one bit at a time from the control message register to digital terminal interface module DT11. Digital terminal interface module DT11 assembles these serial bits into commands for digital terminal T11. Digital terminal T11 responds to these commands by performing the indicated operation, such as lighting a lamp, producing an audible ring signal, etc.

If digital terminal T11 has no reply or other control message to send back to system processor 100, digital terminal interface module DT11 transmits idle bits back to port circuit 111. If digital terminal T11 has a control message to send to system processor 100, it is written into the control message register of port circuit 111 one bit at a time. Port circuit 111 sets a data-ready bit in its status register (not shown) to indicate to system processor 100 that a control message has arrived from digital terminal T11. System processor 100 periodically scans the port circuit status registers via I/O BUS and port data/control interface circuit 171 for a set data-ready bit. When one is found, system processor 100 reads the control message stored in the control message register of port circuit 111 and resets the data-ready bit in the status register.

Figure 4:
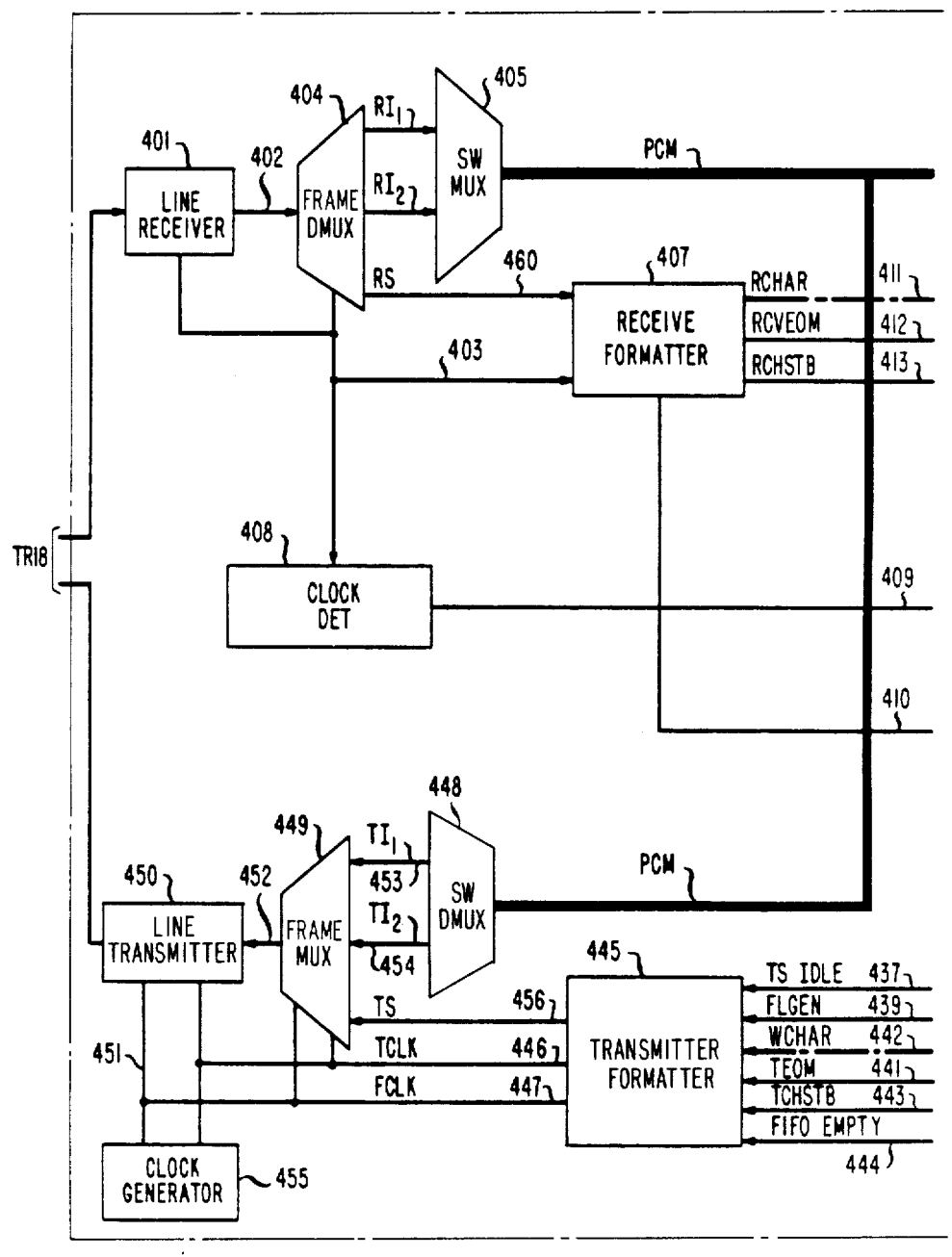
Figure 5:
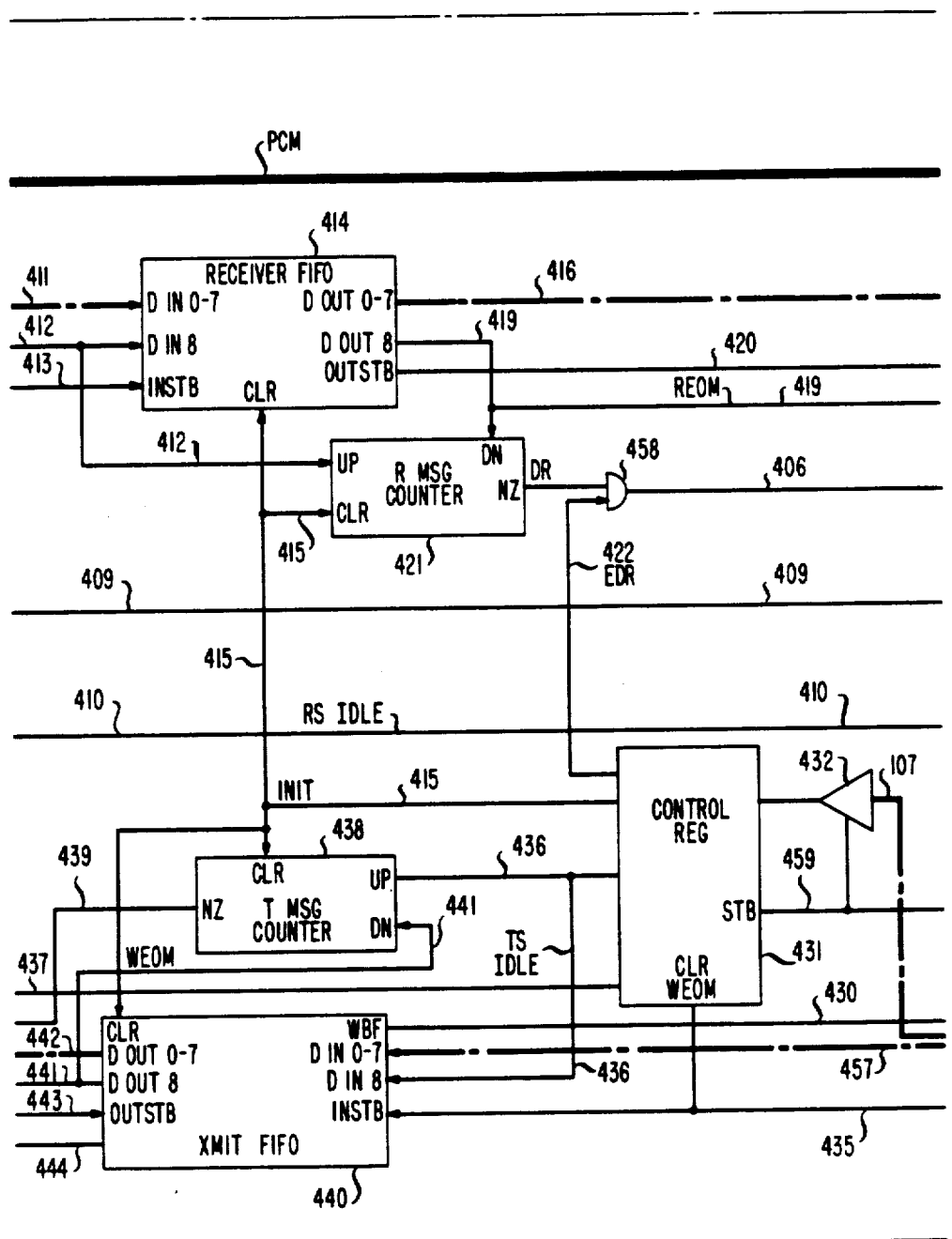

Port Circuit, FIGS. 4-6

FIGS. 4, 5 and 6, when arranged shown in FIG. 7 disclose details of the port circuit with emphasis upon the port circuitry associated with the reception and generation of S bit signaling messages in the DCP frame format shown in FIG. 8. Additionally, details of this circuit are disclosed in U.S. Pat. No. 4,534,023, issued Aug. 6, 1985, to S. R. Peck et al.

The communication leads TR18 comprise a 160 kilobit per second data link to the associated terminal equipment, computer T18. The 160 kilobit rate results from the fact that message segments of 20 bits (as shown in FIG. 8) are transmitted between computer T18 and port circuit 118 at an 8 Khz rate. Alternate bipolar modulation is used to transmit the data signals.

Receiver

The operation of the receiving portion of port circuit 118 is first described. Message segments from computer T18 are received in the DCP frame format and applied over communication leads TR18 to line receiver 401. Line receiver 401 derives its synchronization from the framing bits of each received message segment and passes the remaining fields (the S field and the two I fields) in serial form to frame demultiplexer 404 over lead 402. The synchronization circuitry of line receiver 401 generates a receive clock signal and applies it over lead 403 to the control portion of demultiplexer 404 s well as to receive formatter 407 and clock detector 408.

Line receiver 401 separates the received signal from the noisy environment of the communication leads TR18 and transforms it into a logic level signal that is applied to the input of demultiplexer 404. Demultiplexer 404 demultiplexes the S field and the two I fields. The information in the two I fields comprises the data transmission from computer T18. This data transmission is extended over leads RI$_1$ and RI$_2$ to multiplexer 405 which multiplexes the signals together and places them on time multiplexed bus PCM. Each I field occupies a different time slot on time multiplexed bus PCM and thus the information in each I field is transmitted out sequentially during each occurrence of its associated time slot. This information is applied to the time slot interchange facilities of the system which performs a conventional time slot interchange function and interconnects each I field with the port to which the call is directed. The interface from the switch multiplexer 405 to the bus PCM contains both data and clock signals to control the switch multiplexer 405 and the switch demultiplexer 448.

The S field information comprises one bit of the message segment of FIG. 8 and is applied over lead 460 to the receive formatter 407. Lead 460 comprises an eight kilobit per second serial channel carrying the S field information. Receive formatter 407 performs the customary flag detection operation on this signal. That is, it looks for a pattern of a 0, followed by six 1's and a 0, as shown on FIG. 9, and synchronizes to that pattern as long as the flags appear on lead 460. As soon as receive formatter 407 detects a nonflag sequence, as is the case when a signaling message character is received, it begins to perform a serial-to-parallel conversion on each nonflag byte. During the time when nonflag characters are being received, receive formatter 407 performs a conventional zero delete function whenever it detects a sequence of five 1's followed by a 0. It does this in accordance with the HDLC protocol in order to prevent a message character from being construed as the reception of a flag character. Receive formatter 407, while it is performing this serial-to-parallel conversion on nonflag characters, also detects the reception of a flag character at the end of each message. It then generates a signal that is applied to lead 412 to specify the end of message for the received character. This path is also termed RCVEOM (Receive End Of Message). Receive formatter 407 applies each character after it is formed into a parallel format to leads 411 and from there to the receiver FIFO 414. Receiver formatter 407 also generates a signal that is applied to lead 413 to control the strobing of information into FIFO 414. The signal on lead 413 appears concurrently with the signals on leads 411 and 412 so that they then can be strobed into FIFO 414.

Receive FIFO 414 is organized as a 48 word, nine bit per word FIFO. The nine bits in each word are the eight bits representing the received character on leads 411 and a one bit "end of message" signal on lead 412 indicating whether or not each receive character does or does not represent the last character of a message. The characters that are applied to the input of receive FIFO 414 pass through in the conventional manner to the output of receive FIFO 414. These eight bits are applied over leads 416 to tri-state gates 417. The end of message signal associated with each character is applied over lead 419 to counter 421. The end of message signal is present only when the character is indeed the last character of a message and, at that time, the end of message signal increments counter 421 by a count of one.

Tri-state gates 417 are enabled by a read register signal on lead 420. This signal is generated by system processor 100 an applied to port circuit 111 over I/O BUS via port data/control interface circuit 171 and leads DATA when system processor 100 wishes to read the contents of FIFO 414. System processor 100 effects this operation by applying a unique address signal over the above-described path to address decoder 433 to cause it to generate an output on lead 420 extending to FIFo 414 and gates 417. Each port circuit, including port circuit 111 shown on FIGS. 4, 5 and 6, is assigned a plurality of I/O BUS addresses. The various addresses represent the various functions of which the port circuit is capable. A particular function is initiated by the application of the associated I/O BUS address to address decoder 433. Accordingly, in order to read out a character from FIFO 414, system processor 100 applies the port address associated with lead 420 to address decoder 433 via the DATA leads. Address decoder 433 responds to this address, drives lead 420 to cause the character at the output of FIFO 414 to be extended over leads 416 and through gates 417 to leads DATA. This character is then passed through port data/control interface circuit 171 and over I/O BUS to system processor 100 which stores it and every other received character until a complete message is formed.

The read register lead 420 also extends to the OUTSTB terminal of FIFO 414. FIFO 414 responds to the trailing edge of this signal and advances the next character stored within FIFO 414 to the output of FIFO 414 so that it can be read on the next read register operation. Thus, the read register signal on lead 420 performs two functions. The first is to enable gates 417 to pass the character currently on FIFO 414 output over leads 416, through gates 417 to DATA leads. The trailing edge of the read register signal on lead 420 advances the next character within FIFO 414 to the output of FIFO 414.

The ninth bit in FIFO 414 is the END OF MESSAGE bit on lead 419. This signal performs two functions. The first function is to provide a READ END OF MESSAGE signal to the input of the status gate 416. Status gate 426 can be read by system processor 100 when it performs a READ STATUS REGISTER function on port circuit 111. Status gate 426 has a unique address and when system processor 100 applies this address to I/O BUS, the address is decoded by address decoder 433 which applies an enable signal over lead 429 to activate status gate 426. Status gate 426 applies the signal present on lead 419, to DATA leads for transmission to system processor 100. The enabling of lead 429 enables all of the status register gates 424 through 428.

The second function of the READ END OF MESSAGE signal bit on lead 419 is to decrement receive message counter 421. Counter 421 at any time has a count in it that indicates the number of messages currently stored within FIFO 414. Coutner 421 is incremented by a RECEIVE END OF MESSAGE signal on lead 412 and is decremented when a READ END OF MESSAGE signal is read out of FIFO 414 on lead 419. Thus, the current count of counter 421 represents the number of complete messages currently stored within FIFO 414. The output of counter 421 on lead DR is the signal which permits a DATA READY indication to be read by system processor 100 as it scans status gates 424–428. The DR signal is extended through lead 458 when gate 422 carries an enables signal and from there the signal extends over lead 406 to the input of the scan register gate 423 and to gate 425.

System processor 100 can read either scan register gate 423 or FIFO 414 by applying the appropriate addresses to I/O BUS. The address for either of these is decoded by address decoder 433. The appropriate output of address decoder 433 is enabled to activate the appropriate tri-state gate, such as 423 or 417, to allow data to applied to DATA leads.

Transmit

System processor 100 can generate and write messages into port circuit 118 of FIGS. 4, 5 and 6 for transmission to computer T18. It does this by utilizing the write portion of port circuit 118. The first step system processor 100 performs on a port write operation is to determine whether transmit FIFO 440 is full and is able to accept the message. If FIFO 440 is not full, system processor 100 writes the first byte of the message into port circuit 118. System processor 100 performs this function by first applying the appropriate address signal to I/O BUS. The signal that is applied is that which is associated with the write portion of port circuit 118. Address decoder 433 decodes this address and generates the WREG signal on lead 435. This signal enables tri-state gate 434 which allows the message information now on I/O BUS to be extended through gate 434 and over lead 457 to the input of FIFO 440. This signal on lead 435 is also applied to the INSTB input of FIFO 440 to strobe the message information currently on lead 457 into FIFO 440.

Also strobed into FIFO 440 at this time is the ninth bit, a WRITE END OF MESSAGE bit, which is applied to FIFO 440 over lead 436. This signal indicates that the character associated with this bit is the last character of a transmitted message. System processor 100 sequentially writes each character of a message into FIFO 440. Just before the last charcter of the message is to be input into FIFO 440, system processor 100 writes into control register 431 via gate 432 and lead 459 to generate a WRITE END OF MESSAGE signal on lead 436. This signal is strobed into FIFO 440 at the same time the last byte of the message is strobed via the WREG signal on lead 435. The signal on lead 436 is automatically reset after the last byte is written into FIFO 440 by the trailing edge of the WREG signal on lead 435.

Transmit FIFO 440 is organized as a 48 word by nine bits per word FIFO. Eight of the nine bits represents the character information; the ninth bit of each word represents the absence or presence of a WRITE END OF MESSAGE signal. Transmit FIFO 440 has a WRITE BUFFER FULL output termed WBF. When all 48 words in FIFO 440 are filled, the WBF signal is extended over lead 430 to status register gate 427. This gate is periodically read by system processor 100 prior to writing FIFO 440. When FIFO 440 is full, the output of gate 427 advises system processor 100 that FIFO 440 can accept no more bytes for the time being. If FIFO 440 is detected to be full in the middle of writing a message, system processor 100 will queue the remainder of the message and throttle the load until a previously loaded message is transmitted and FIFO 440 becomes sufficiently empty to accept at least one more byte.

The outputs of FIFO 440 are applied to leads 441 and 442. Lead 442 carries eight bits representing character information and lead 441 carries an AND OF MESSAGE bit. FIFO 440 receives a strobe siganal from transmit formatter 445 over lead 443. The character information on lead 442 and the END OF MESSAGE signal on lead 441 are applied to the input of transmit formatter 445. Transmit formatter 445 normally continuously generates and sends out flag characters on the channel to the associated customer station as long as there are no messages in FIFO 440. At such times, transmit formatter 445 sequentially generates a flag character of 0, six 1's and a 0. Whenever FIFO 440 is not empty, transmit formatter 445 begins the process of unloading the characters from FIFO 440 and transmitting them out over the S channel. It does this by performing a parallel-to-serial conversion on the received characters and the zero insertion function required for transparency. Thus, transmit formatter 445 first sends out flag characters when it detemrines from transmit FIFO 440 over lead 439 that FIFO 440 is not empty, then, at the end of transmission of the flag character, transmit formatter 445 generates a strobe signal that is applied over lead 443 to FIFO 440. This signal is used internally by transmit formatter 445 to load the character information on lead 442 and any END OF MESSAGE signal on lead 441 into transmit formatter 445. The trailing edge of this strobe signal is also used to advance FIFO 440 to bring the next character in FIFO 440 to the FIFO output.

Transmit formatter 445 performs a parallel-to-serial conversion on the received information. It also performs a zero insertion function when it is sending non-flag characters out over lead 446. That is, if the transmitted bit stream of the message has five consecutive 1's, transmit formatter 445 inserts a 0 between the fifth-1 and the next bit transmitted. Thus, transmit formatter 445 transmits out each character it receives and it checks the END OF MESSAGE bit associated with each character. When the last character in a message is received from FIFO 440, lead 441 is set to a 1. This tells transmit formatter 445 that this character is the end of a message and causes transmit formatter 445 to insert a flag after this character. Transmit formatter 445 does this and then checks for a transmit empty signal on lead 444. If the empty signal is present, transmit formatter 445 continues to generate and transmit flags. If the empty signal is not present, transmit formatter 445 then reads the next character out of FIFO 440. This new signal is a first character of a subsequent message. Transmit formatter 445 processes any such first characters of the subsequent message, and all other characters of that subsequent message, in a manner similar to that already described.

System processor 100 can write an initialize bit into control register 431. This bit causes FIFOs 414 and 440 to be cleared as well as the message counters 421 and 438. This effectively removes all information from port circuit 118.

Lead 409 interconnects clock detector 408 with status register gate 424. Clock detector 408 normally receives clock pulses on lead 403 from line receiver 401. At such times, clock detector 408 applies a 0 over lead 409 to register gate 424. This permits system processor 100, when reading register gates 424-428, to determine that clock pulses derived from the received data stream are being received over communication leads TR18 by line receiver 401 and applied over lead 403 to clock detector 408. This is the normal operable state of the system. If, for any reason, line receiver 401 fails to receive a data stream, clock detector 408 receives no clock pulses and sets lead 409 equal to a 1 to permit system processor 100 to read gate 424 and determine this condition. This condition could exist for example when the associated digital terminal T11 is disconnected from communication leads TR11.

Lead 422 interconnects the lower input of AND gate 458 with control register 431. This path is normally hedl in an enabled state by control register. This enables gte 458 and permits the DR output of counter 421 to be extended over lead 406 to scan register gate 423. This DATA READY signal is used to advise system processor 100 that at least a single message is currently contained within receive FIFO 414.

Address decoder 433 contains flip-flops so that when an address is applied to the I/O BUS together with appropriate control signal by system processor 100, these control signals latch the address into the decoder flip-flops. The output of these flip-flops extends to circuitry which decode the address and give output signals unique to each different address. One of these output signals extends to lead 459. This signal is active at the time that data appears on I/O BUS and is used to strobe the data into latches in control register 43. That data is persistent because it is latched into control register 431. Control register 431 contains flip-flops which store the state of port circuit 111 as controlled by system processor 100, as subsequently described.

Transmit message counter 438 functions similarly to receive message counter 42 to indicate whether FIFO 440 currently contains a complete message. Transmit message counter 438 is incremented over lead 436 when a message is entered into FIFO 440. Transmit message counter 438 is decremented over lead 441 when a message is read out of FIFO 440.

The output of transmit formatter 445 extends over lead 456 to the frame multiplexer 449. Switch demultiplexer 448 receives PCM time slot signals on bus PCM, separates out the I1 and I2 field signals for use by port circuit 118 from their assigned time slots and applies them to leads 453 and 454. An output of transmit message counter 438 extends to transmit formatter 445 on lead 439 which indicates when the contents of transmit message counter 438 is 0. This implies that no messages are contained in FIFO 440 and that transmit formatter 445 should generate flag characters.

The I1, I2 signals are received by frame multiplexer 449 together with the serialized S channel bits on lead 456. Once each frame, frame multplexer 449 inserts the eight bit I1 field, the eight bit I2 field and the one bit S field into a framing signal and applies it over lead 452 to the line transmitter 450 which adds the F field bits. From there, resultant twenty bit frame of FIG. 8 is extended over communication leads TR18 to computer T18.

Line transmitter 450 and frame multiplexer 449 operate under control of the output signals from clock generator 455. Switch demultiplexer 448 receives its control signals from bus PCM.

Details of DCP Interface Card

DCP interface card 201 is a processor controlled circuit which functions as a message handler and protocol converter. DCP interface card 201 converts the DCP signals of port circuit 151 and digital telephone station set T51 to data for PC BUS 207 and vice versa. The physical and link layer protocols are handled by the devices which comprise DCP interface card 201. DCP interface card 201 provides personal computer PC51 with access to and control of data and signaling both to and from the business communication system. DCP interface card 201 looks to the business communication system like a digital phone with data and display modules while DCP interface card 201 looks to the digital telephone station set like a digital port board of the business communication system. Information from both the business communication system and the digital telephone station set associated with personal computer PC51 is transferred to personal computer PC51 over a single multiplexed data channel. With access to and control of the signaling channel to the business communication system personal computer PC51 can implement advanced voice and data features in cooperation with the operation of the existing voice and data features on the business communication system.

Figure 3:
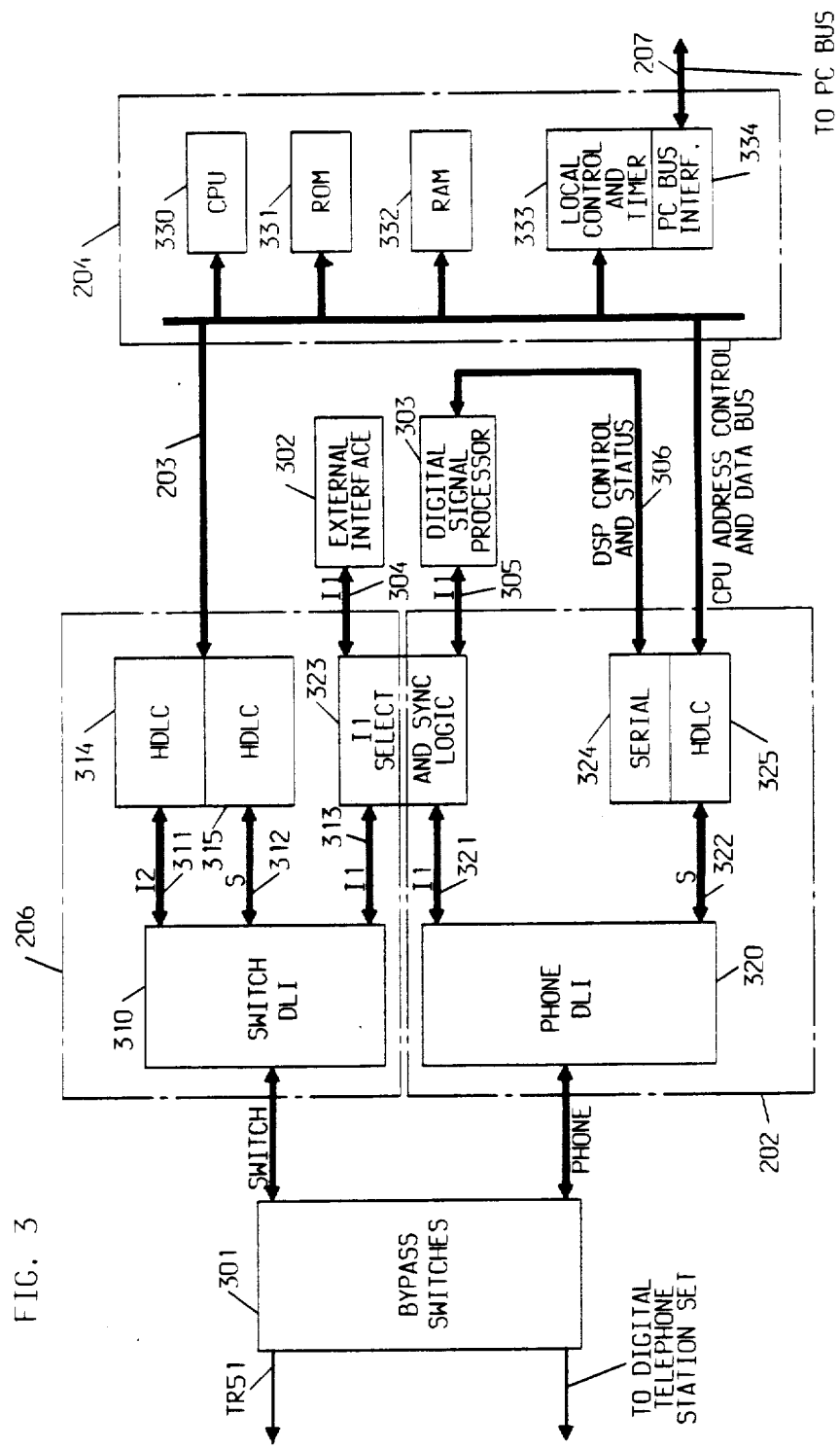
FIG. 3 illustrates a detailed schematic diagram of the subject interface apparatus.

FIG. 3 is a detailed block diagram schematic of DCP interface card 201. The major functional pieces of DCP interface card 201 as described above are illustrated in further detail in FIG. 3. These major components parts include telephone station se interface 202, bus communication controller 204 and business communication system interface 206. In addition to these major components FIG. 3 illustrates bypass switches 301 which function to directly connect the digital telephone station set to the communication leads TR51 in the case where personal computer PC51 is turned off or there is a power failure. External interface 302 is a connection shown to DCP interface card 201 which can be used for additional equipment such as a speaker phone, as will be described below. Digital signal processor 303 is a wired logic device which functions to perform call progress tone and Touch-Tone detection and Touch-Tone signal generation as will be described below.

CPU 330

The operation of DCP interface card 201 is controlled by a microprocessor shown on FIG. 3 as CPU 330. CPU 330 can be any state of the art microprocessor such as a Motorola 68000 16 bit microprocessor. CPU 330 is a microprocessor that supports the high level C programming language. CPU 330 works off a vectored interrupt scheme to speed software response to interrupts. The main functions of CPU 330 are:

(1) communicate with the business communication system over the S channel through the switch S channel HDLC protocol and terminate levels 2 and 3 of the S channel terminal protocol, (2) send and receive data over the I2 channel of the HDLC protocol to the business communication system and terminate levels 2 and 3 of this protocol, (3) communicate with the digital telephone station set over the S channel through the phone S channel HDLC protocol and terminate level 2 of this protocol, (4) control digital signal processor 303 to generate Touch-Tone signals or to detect both call progress tones and Touch-Tone signals, (5) control bypass switches 301 and the I1 select and sync logic 323, (6) control timing and respond to interrupts used in protocol processing, (7) communicate with personal computer PC51 over PC BUS 207 to send and receive message between DCP interface card 201 and personal computer PC51 to send and receive information for all the data channels described above.

Line Termination

In order to understand the operation of CPU 330 it is first necessary to understand the operation of telephone station set interface 202 and business communication system interface 206. As was mentioned above, the communication leads TR51 and the communication leads from the digital telephone station set are terminated on bypass switches 301. Bypass switches 301 either connect the signals from the business communication system directly to the digital telephone station set or connect the signals from both the digital telephone station set and the business communication system to telephone station set interface 202 and business communication system interface 206 respectively. In this fashion, bypass switches 301 operate to perform a power failure transfer function. Bypass switches 301 are operated to directly connect the digital telephone station set to the business communication system when personal computer PC51 is not turned on or not functioning properly or there is a power failure or DCP interface card 201 is not functioning properly. In all other cases bypass switches 301 are not operated and the communication leads TR51 is terminated on business communication system interface 206. In similar fashion, the communication leads from digital telephone station set T51 are routed through bypass switches 301 to terminate on telephone station set interface 202.

Both telephone station set interface 202 and business communication system interface2 06 contain a DCP interface circuit identified on FIG. 3 as switch DLI 310 and phone DLI 320 respectively. Both switch DLI 310 and phone DLI 320 implement a DCP system interface as was described above in the discussion of port circuit 118. In particular, switch DLI 310 and phone DLI 320 comprise line receiver 401, frame demultiplexer 404, clock detector circuit 408, line transmitter 450, frame multiplexer 449 and clock generator 455 of FIG. 4 as described above for port circuit 118. These elements operate as described above to terminate the DCP signaling protocol. The switch DLI 310 is configured in the terminal mode so that it appears as a digital telephone station set with display and data modules to the business communication system. Phone DLI 320 is configured in the port mode so it appears as a digital port such as port circuit 118 to digital telephone station set T51. Both switch DLI 310 and phone DLI 320 separate the received DCP signals into the serial S, I1, and I2 channels and combine and transmitted serial S, I1, and I2 channels into the transmitted DCP signals as described above.

S, I1 and I2 Channel Signal Routing

The S, I1 and I2 channels are all used in the DCP protocol transmissions between the business communication system and the DCP interface card 201 to carry voice, control and data signals therebetween. Between digital telephone station set T51 and DCP interface card 201 only the S1 and the I1 channels are used to transmit control and voice signals. The S2 and I2 channels are not used with the digital telephone station set because all data transmissions to and from the business communication system are terminated on personal computer PC51.

Signals carried on the I1 channel are the voice communication signals which are transmitted between the digital telephone station set and the business communication system. Therefore, the voice signals of the I1 channel are not switched to personal computer PC51 in this described application. I1 select and synchronization logic 323 functions to interconnect the various sources and destinations for the I1 channel voice signals. The voice signals can originate from digital telephone station set T51, from digital signal processor 303 as Touch-Tone signals, from the business communication system on communication leads TR51 or from external interface 302. The voice communication signals on the I1 channel can be directed to digital telephone station set T51 from the business communication system or from the digital signal processor 303 or from external interface 302. Therefore, I1 select and sync logic 323 interconnects the voice communication signals from either the business communication system as separated by switch DLI 310 and applied to lead 313 or from external interface 302 and applied to lead 304 or from digital signal processor 303 and applied to lead 305 to lead 321 which carries these voice communication signals to the phone DLI 320 where these voice signals are encoded into the DCP signaling format and transmitted to digital telephone station set T51. In similar fashion, voice communication signals can be directed to external interface 302 from either the business communication system or digital telephone station set T51. I1 select and sync logic 323 receives the voice communication signals from the business communication system as decoded by switch DLI 310 and applied to lead 313 or from digital telephone station set T51 and decoded by phone DLI 320 and applied to lead 321 and switches these signals to lead 304 where they are applied to external interface 302. Switch DLI 310 receives voice communication signals from external interface 302 or from digital signal processor 303 or from digital telephone station set T51 via I1 select and sync logic 323. The remaining destination for voice communication signals is digital signal processor 303. Digital signal processor 303 is a wired logic processor which functions to decode call progress tones or Touch-Tone signals received from the business communication system. These call progress tones and Touch-Tone signals are transmitted by the business communication system over communication leads TR51 and decoded by switch DLI 310 and applied to lead 313. I1 select and sync logic 323 switches the received tones to lead 305 to digital signal processor 303 where these tones are detected and analyzed. The resulting control signals identifying the call progress tone or Touch-Tone signals are applied by digital signal processor 303 to lead 306.

I/O Devices

Devices 314, 315, 324 and 325 are serial input/output devices each of which contains an independent full duplex serial data channel that is programmable for either synchronous or asynchronous modes. These devices are commercially available input/output devices such as a MOSTEK MC68564P device. Input/output devices 314 and 315 are programmed to handle the HDLC bit synchronous mode to process the switch S and I2 data channels. Input/output device 324 is programmed to the asynchronous mode to communicate with digital signal processor 303 while input/output device 325 is programmed to the HDLC bit synchronous mode to handle the S channel for the digital telephone station set. The serial channels programmed for the HDLC mode have the following attributes:
(1) automatic 0 insertion and deletion
(2) automatic flag insertion between messages
(3) abort sequence generation and detection
(4) internal flag detection and synchronization
(5) automatic cyclinc redundancy check The asynchronous communication channel with digital signal processor 303 has the following attributes: six bits per character; one start bit; one stop bit; no parity. Input/output devices 314, 315, 324, 325 contain control, status and data registers. These devices generate interrupts when either the received data register contains data or the transmit data register needs data. CPU 330 responds to the interrupts generated by one of devices 314, 315, 324, 325 and applied to CPU address control and data bus leads 203 by reading the contents of the received data register for a received interrupt and sending a character to the transmit data register for a transmit interrupt in the device generating the interrupt.

Thus, when digital signal processor 303 interprets call progress tones, the resultant control signals are loaded in the registers of I/O device 324 and I/O device 324 generates an interrupt for CPU 330. CPU 330 responds to this interrupt by reading the data register indicating the call progress tone present on communication leads TR51 from the registers in I/O device 324.

Digital Signal Processor

Digital signal processor 303 is programmed for three modes of operation, Touch-Tone generation and the detection of call progress tone or Touch-Tone signals. CPU 330 controls the operation of digital signal processor 303 via the registers In I/O device 324. In Touch-Tone generation mode, CPU 330 transmits a Touch-Tone command via CPU address, control and data bus 203 to I/O device 324. Digital signal processor 303 reads the Touch-Tone command from I/O device 324 and generates the Touch-Tone signals which are applied via lead 305 to I1 select and sync logic 323. I1 select and sync logic 323 forwards the generated Touch-Tone signals via lead 313 to switch DLI 310 which incorporates the generated Touch-Tone signals into the I1 field of a DCP signal which is applied to communication leads TR51 to the business communication system. In similar fashion, CPU 330 can apply control signals to CPu address control and data bus 203 to load call progress tone detection or Touch-Tone signal detection commands into I/O device 324. Digital signal processor 303 responds to these loaded call progress tone detection or Touch-Tone signal detection commands by monitoring the I1 channel from the business communication system to detect the presence of call progress tones or Touch-Tone signals on communication leads TR51. This is accomplished by switch DLI 310 decoding the I1 channel signals from the DCP signals received from the business communication system, and applying the deocded I1 signals to lead 313 to I1 select and sync logic 323 which forwards the I1 channel signals via lead 305 to digital signal processor 303. Digital signal processor 303 is capable of detecting busy signals, dial tone, reorder tone, ringing intercept tone, call configuration tones and all Touch-Tone signals. Digital signal processor 303 generates a call progress tone detected message or a Touch-Tone detected message in the response to the presence of one of the above tones and loads the tone detected message into the received data registers of I/O device 324 which device generates an interrupt for CPU 330. CPU 330 reads the tone detected message from I/O device 324 via CPU address control and data bus 203.

Memory and Timing

Read only memory 331 is the memory device on DCP interface card 201 which contains the instruction set for the operation of CPU 330. Random access memory 332 consists of the read/write memory which is used by CPU 330 as read/write memory space for transferring information to and from personal computer PC51. Local control and timer 333 and PC BUS interface 334 is a commercially available chip such as the Motorola MC68230 parallel interface/timer device. This combined device generates all the asynchronous bus interface signals and generates interrupt vectors for the timer and the parallel I/O registers. The parallel interface portion of this device is programmed to the bidirectioal eight bit mode. PC BUS interface 334 functions to provide a buffered interface between PC BUS 207 and CPU address control and data bus 203.

Device Driver Protocol

S channel messages and I2 data from the business communication system and S1 channel messages from the adjunct telephone station set T51 as well as local control messages between DCP interface card 201 and device driver 211 are formatted into message frames, multiplexed into a single data stream, and transmitted between DCP interface card 201 and interrupt service routine 212 of device driver 211 via PC BUS 207. Each message frame in this data stream is delineated by an address header byte which is followed by a message length byte. The actual message is located in the message frame following the message length byte. A control register (not shown) in PC Bus interface 334 of DCP interface card 201 gives device drivers 211 control of both transmit and receive interrupts as well as transmit and receive direct memory access. The message frames are transferred between DCP interface card 201 and device driver 211 on either a per byte basis using one interrupt per byte of data transferred or by direct memory access using one interrupt per block of data transferred. PC Bus interface 334 contains both a transmit register (not shown) and a receive register (not shown) which are used to store the message frames transferred between DCP interface card 201 and device driver 211.

Device Driver 211

Device driver 211 is a software process that runs on processor 209 of PC51. Device driver 211 interfaces communication management application 210 with DCP interface card 201. As shown on FIG. 2, two software processes are included in device driver 211. Interrupt service routine 212 processes the data stream on PC BUS 207 and exchanges message frames between DCP interface card 201 and communication management application 210 by storing/retrieving the message frames in memory 208. In similar fashion, application interface 213 transfers message frames between communication management application 210 and memory 208. Interprocess communication path 214 is shown on FIG.

2 as interconnecting application interface 213 and interrupt service routine 212. This is a control message communication channel for passing control message between application interface 213 and interrupt service routine 212. The actual implementation of interprocess communication path 214 is typically by way of each process accessing an interprocess communication section of memory 208. The interprocess communication section of memory 208 functions as a "mailbox" with each of processes 212 and 213 placing/retrieving messages into/from interprocess communication section of memory 208. These mailbox messages can be simply the setting of a flag or pointer for many communication applications.

Keep Alive Process

Figure 10:
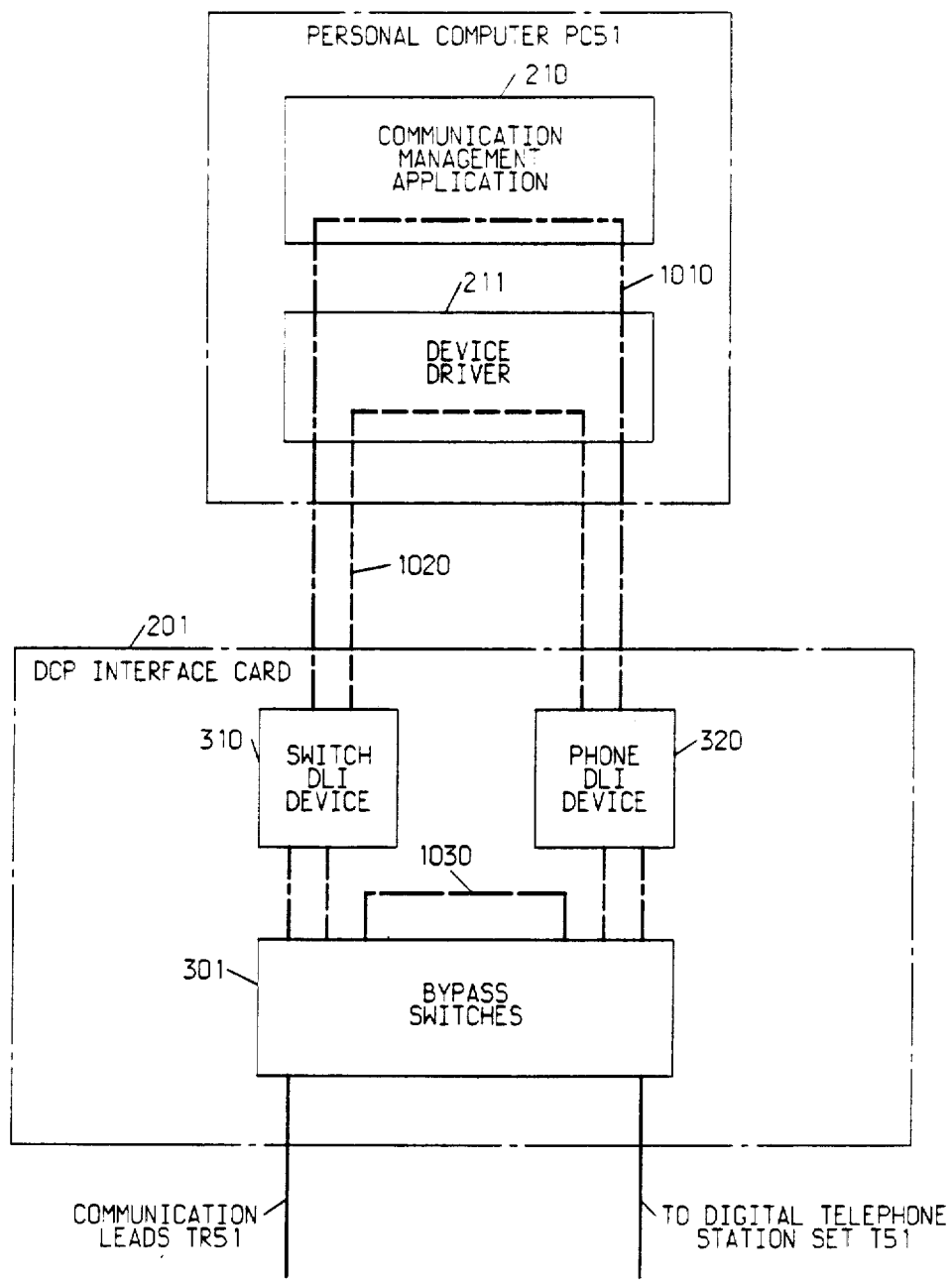
FIG. 10 depicts the three different modes of connectivity between the device driver, communication management application and the DCP interface card.

A keep alive process is used by DCP interface card 201 to maintain telephone service between digital telephone station set T51 and the business communication system even if device driver 211 or communication management application 210 fail. The various modes of communication are schematically illustrated in FIG. 10. Path 1010 indicates the normal or CMA mode of message flow while path 1020 illustrates a soft direct connect mode described below and path 1030 illustrates a direct connect mode described below.

If communication between DCP interface card 201 and device driver 211 fails, DCP interface card 201 enters a direct connect mode so that digital telephone station set T51 is directly connected to the business communication system. Timer 333 on DCP interface card 201 runs continuously and is reset on each message received from device driver 211. The business communication system transmits an S1 channel message to each digital telephone station set every 6 to 12 seconds. These S1 channel messages are received by DCP interface card 201 and forwarded to device driver 211 as described above. Device driver 211 forwards this S1 channel message, or a modified version of the message, or a response message to DCP interface card 201. Thus, this periodic S1 channel message maintains the keep alive process timer.

If device driver 211 fails to transmit a message to DCP interface card 201 within 13 seconds, timer 333 times out and CPU 330 transmits a local control message to device driver 211 to indicate that DCP interface card 201 is about to enter the direct connect mode. If device driver 211 responds to this local control message within 2 seconds, CPU 330 resets timer 333. If device driver 211 does not respond to this control message within 2 seconds, CPU 330 activates bypass switches 301 to directly conenct digital telephone station set T51 to communication leads TR51 (path 1030).

Another level of keep alive process is where communication management application 210 fails but device driver 211 is functioning. This is called soft direct connect mode (path 1020). The soft direct connect mode is activated when device driver 211 is functioning and receive the above-mentioned local control message indicating that DCP interface card 201 is about to enter the direct connect mode. If communication management application 210 does not respond to this message, device driver 211 enters the soft direct connect mode and forwards all messages received without the intervention of communication management application 210.

Voice Originated Call From PC51

In order to better understand the operation of DCP interface card 201 and device driver 211, the following description of a simple call connection is used to illustrate the operation of the above described elements which comprise DCP interface card 201 and device driver 211. Voice calls can be originated from PC51 in several different ways: keyboard dialing, mnemonic dialing, or directory dialing. For the purposes of this description, keyboard dialing will be used as an illustrative example.

A person (described below as user) accessing PC51 initiates a voice call by entering a number from the keyboard of PC51 and then pressing the carriage return key on the keyboard of PC51. In response to the entry of this keyboard dialed number, communication management application 210 transmits an S1 channel (the voice control portion of the S channel) off-hook message to application interface 213. Application interface 213 responds to this off-hook message by enabling the transmit interrupt in the control register portion of PC Bus interface 334 and changing buffer pointers via path 214 for interrupt service routine 212. Receive interrupts are always enabled. PC Bus interface 334 generates an interrupt when the transmit register is empty. Interrupt service routine 212 responds to the transmit register empty interrupt by forwarding the off-hook control message, which is temporarily stored in memory at the end of the trasmit buffer, along with the appropriate address header byte and message length byte over PC BUS 207 to PC Bus interface 334 and thence through local control and timer 333 and over CPU address, control and data bus 203 to CPU 330 on DCP interface card 201. Upon completion of the transmission of the off-hook message, interrupt service routine 212 disables the transmit interrupt in the control register of PC Bus interface 334.

Message Transfer Between PC Bus and Communication Leads

CPU 330 responds to the received off-hook message by forwarding this message via CPU address, control and data bus 203 to HDLC device 315. As discussed above, HDLC device 315 in cooperation with switch DLI 310 formats and transmits DCP format message frames to the business communication system by way of communication leads TR51.

Upon receipt of the off-hook message forwarded by CPU 330, the business communication system responds by transmitting a DCP message frame which contains an S1 channel lamp update message to DCP interface card 201 via communication leads TR51. This lamp update message is retrieved from the DCP message frame by switch DLI 310 and forwarded on lead 312 to HDLC device 315. CPU 330 retrieves the lamp update message from HDLC device 315 via CPU address, control and data bus 203. CPU 330 appends address header and message length bytes to the lamp update message to create a message frame for PC51. CPU 330 then generates an interrupt by way of PC bus interface 334 to device driver 211. Interrupt service routine 212 of device driver 211 responds to the receive interrupt by reading the lamp update message via interrupts and direct memory access from the receive register in PC bus interface 334 where CPU 330 has forwarded the message frame containing the lamp update message. Interrupt service routine 212 stores the S1 channel lamp update message in a buffer in memory 208 for communication management application 210. Communication management application 210 periodically polls application interface 213 and reads the stored lamp update message via application interface 213 which retrieves the lamp update message from memory 208.

Control Message from PC51 to Telephone Station Set T51

Communication management application 210 responds to the lamp update message by updating the screen on PC51 to indicate to the user at PC51 that the off-hook signal has been received by the business communication system. Communication management application 210 also forwards the lamp update message to adjunct telephone station set T51 by way of DCP interface card 201. This is accomplished by communication management application 210 transmitting the lamp update message to application interface 213 which appends the appropriate address header and message length bytes and places this message in memory 208. As described above, application interface 213 enables the transmit interrupt in the control register portion of PC Bus interface 334. Interrupt service routine 212 then forwards the lamp update message by interrupts and DMA to PC Bus interface 334 which forwards this message through local control and timer 333 and CPU address, control and data bus 203 to CPU 330. Upon completion of the message transmission, interrupt service routine 212 disables the transmit interrupt in the control register of PC Bus interface 334.

CPU 330 responds to the received lamp update message designated for telephone station set T51 by transmitting the lamp update message via CPU address, control and data bus 203 to HDLC device 325 where the lamp update message is forwarded to phone DLI 320 for formatting into a DCP message frame for adjunct telephone station set T51. As described above, phone DLI 320 transmits DCP format message frames to adjunct telephone station set T51 and the subject lamp update message is transmitted as described above.

Dialed Number Processing

Comunication management application 210 now processes the number entered by the user at PC51 through the keyboard. Communication management application 210 transmits the dial string entered from the keyboard to application interface 213, which parses the dial string and transmits the digits through a generate Touch-Tone control message through memory 208 and interrupt service routine 212 to CPU 330 via the transmit register as described above. CPU 330 responds to the generate Touch-Tone control message by transmitting control signals via CPU address, control and data bus 203 to digital signal processor 303 as described above. Digital signal processor 303 responds to the control signals transmitted by CPU 330 by generating corresponding Touch-Tone signals on the I1 channel for transmission to the business communication system. The Touch-Tone signals generated by digital signal processor 303 are forwarded over lead 305 to I1 select and sync logic 323 where the signals are routed over lead 313 to switch DLI 310. The Touch-Tone signals so routed are formatted into a DCP message frame for transmission to the business communication system via communication leads TR51.

Second Dial Tone

If, as part of the dialing, a wait for the second dial tone is needed, application interface 213 sets pointers and flags via interprocess control path 214 for interrupt service routine 212. Application interface 213 sends a call progress monitor control message via memory 208 and interrupt service routine 212 to CPU 330. CPU 330 responds to the call progress monitor control message by placing digital signal processor 303 in a call progress monitor mode wherein digital signal processor 303 is connected by I1 select and sync logic 323 to switch DLI 310 to monitor all signals received from the business communication system on communication leads TR51 to determine whether dial tone is present on communication leads TR51 in the I1 field of the DCP message frames. When a dial tone signal is received from the business communication system in the I1 field of a DCP message frame on communication leads TR51, this dial tone signal is routed in standard fashion by switch DLI 310 over lead 313 to I1 select and sync logid 323 which forwards the dial tone signal over lead 305 to digital signal processor 303. Digital signal processor 303 responds to the received dial tone by transmitting a control signal over lead 306, I/O device 324 and CPU address, control and data bus 203 to CPU 330 indicating that dial tone has been received. CPU 330 responds to this dial tone received signal by generating a dial tone received control message which is transmitted by PC Bus interface 334 to interrupt service routine 212. In response to the received dial tone received control message, interrupt service routine 212 transmits the remainder of the dial string in control messages via PC Bus interface 334 to CPU 330. CPU 330 interprets the received dial string messages and generates signals to digital signal processor 303 which generates and transmits the appropriate Touch-Tone signals to I1 select and sync logic 323. When all the Touch-Tone signals have been transmitted by digital signal processor 303 to the business communication system via communication leads TR51, interrupt service routine 212 transmits a control message via PC Bus interface 334 to CPU 330 to place digital signal processor 303 in a call progress monitor mode to determine the status of the call for feedback to the user.

Ringing the Called Party

Once the business communication system receives the Touch-Tone signals corresponding to the complete dial string, the business communication system signals the called party and transmits the called party identification to DCP interface card 201 in an S1 channel display message. The called party display message is transmitted by the business communication system in a DCP message frame over communication leads TR51 to switch DLI 310. The S channel portion of the DCP message frame is forwarded by switch DLI 310 over lead 312 to HDLC device 315. As discussed above, CPU 330 retrieves the called party display message from HDLC device 315 via CPU address, control and data bus 203. CPU 330 responds to the received called party display message by appending the appropriate address header and message length bytes before transmitting the message to interrupt service routine 212. Interrupt service routine 212 reads the called party display message via interrupts and direct memory access and places the called party display message in a buffer in memory 208 for communication management application 210. Communication management application 210 periodically polls application interface 213 and thereby obtains the called party display message from memory 208 via application interface 213. In response to the received called party display message, communication management application 210 updates the screen on PC51 to indicate to the user that the call has been placed to the designated party. Communication management application 210 also forwards the called party display message to adjunct telephone station set T51 as was described above for the off-hook message.

The business communication system transmits periodic ring back tones on the I1 channel of the DCP message frames to DCP interface card 201 over communication leads TR51 to indicate that the called party is being rung. Digital signal processor 303 is in the call progress monitoring mode and responds to each received ring back tone by generating a control signal for CPU 330. CPU 330 responds to each call progress tone received by digital signal processor 303 by transmitting a control message via PC Bus interface 334 to interrupt service routine 212. This control message causes interrupt service routine 212 to transmit a call progress monitor control message to CPU 330 to reset the timer. Interrupt service routine 212 will also pass the ring back information to communication management application 210 by way of interprocess control path 214 to application interface 213. Communication management application 210 displays ring back information to the user by flashing the test "Ringing" on the screen of PC51. The user at PC51 can now pick up the handset on adjunct telephone station set T51 to be connected to the call or can wait for the called party to answer. If the user has turned on a speakerphone connected to external interface 302, the user hears ringback tone and is automatically connected to the called party when the called party answers the call by going off-hook.

Call Completion

Assume for the purpose of this description that the user at PC51 picks up the handset on adjunct telephone station set T51. At this point, the user is connected from adjunct telephone station set T51 through phone DLI 320, I1 select and sync logic 323, switch DLI 310 and the I1 channel of communication leads TR51 to the business communication system. When the called party answers, ring back tones are no longer placed on the I1 channel of the DCP message frames by the business communication system. Since these call progress tones are no longer present, digital signal processor 303 detects no tones and does not forward a control signal to CPU 330. Since no call progress tone control messages are forwarded by CPU 330 to device driver 211, device driver 211 does not send any call progress monitor control signal to CPU 330. Thus, CPU 330 times out and turns off digital signal processor 303 and then sends a control message to interrupt service routine 212 to indicate that digital signal processor 303 has been turned off. In this fashion, the call progress tone monitoring is disabled.

Call Termination

Upon the completion of the call, the user at adjunct telephone station set T51 goes on-hook. Adjunct telephone station set T51 responds to the on-hook condition by transmitting an S1 channel on-hook message to DCP interface card 201. Phone DLI 320 splits the S channel message from the HDLC message frame received from adjunct telephone station set T51 and transmits this S channel message over lead 322 to HDLC device 325. CPU 330 reads the on-hook message stored in HDLC device 325 via CPU address, control and data bus 203. CPU 330 responds to the on-hook message by generating a message frame which is transmitted by PC Bus interface 334 to interrupt service routine 212. Interrupt service routine 212 buffers the on-hook message in memory 208 for communication management application 210 to read during its next periodic poll of application interface 213. Communication management application 210 then forwards the on-hook message to CPU 330 via PC Bus interface 334 to be transmitted to the business communication system. CPU 330 responds to the on-hook message from interrupt service routine 212 by forwarding the on-hook message via CPU address, control and data bus 203 to HDLC device 315 which forwards the HDLC framed on-hook message to switch DLI 310 for formatting into a DCP message frame for transmission to the business communication system over communication leads TR51.

Final lamp update and display messages are transmitted to DCP interface card 201 by the business communication system in response to the on-hook message. These lamp update and display messages are S channel messages which are received by DCP interface card 201 over communication leads TR51. Switch DLI 310 routes these S channel messages to HDLC device 315 where they are stored for access by CPU 330. CPU 330 reads the lamp update and display messages from HDLC device 315 and formats them with the appropriate address header and message length bytes into a message frame for interrupt service routine 212. Interrupt service routine 212 stores the lamp update and display messages in memory 208 for access by communication management application 210 during the next poll of application interface 213 by communication management application 210. Communication management application 210 responds to the lamp update and display messages by updating the screen on PC51 and by forwarding the lamp update and display information via application interface 213 and interrupt service routine 212 to CPU 330 for forwarding as described above to adjunct telephone station set T51 to update the lamps on adjunct telephone station set T51.

The above description of a keyboard dialing originated call from PC51 can be replicated for mnemonic or directory dialing in similar fashion. In these two cases communication management application 210 responds to the information input by the user on the keyboard to access memory 208 to thereby retrieve a dial string associated with the mnemonic or directory entry input by the user via the keyboard. The resultant dial stream will then be processed as described above for the keyboard dialing case. In this fashion communication management application 210 can place a call using either the direct keyboard entry dialing or by performing a translation function from the directory identification or the mnemonic identification of a called party.

Data Originated Calls from PC51

The above description related to a voice call placed from PC51 to a called party. In similar fashion, a data call can be placed by a user at PC51 in one of several ways: keyboard dialing, mnemonic dialing or directory dialing. As above, keyboard dialing is selected as an illustrative example of a typical call origination setup sequence. The user at PC51 initiates a data call using keyboard dialing by entering a called party identification number from the keyboard of PC51 and then pressing the carriage return key on the keyboard of PC51. Communication management application 210 responds to the entered called party identification number by transmitting a control message to application interface 213 requesting that a data call be placed to the specified called party identification number using the specified baud rate. Application interface 213 responds to this data control message by transmitting an S2 channel (the data control portion of the S channel) off-hook message to the business communication system. Application interface 213 sends the dial string and baud rate to interrupt service routine 212 via 214. This is accomplished as described above by application interface 213 enabling a transmit interrupt in the control register portion of PC Bus interface 334. DCP interface card 201 generates an interrupt when the transmit register portion of PC Bus interface 334 is empty. Interrupt service routine 212 responds to this interrupt by transmitting the S2 channel off-hook message along with the appropriate address header and message length bytes via interrupts and direct memory access to CPU 330 via PC Bus interface 334. Once this S2 channel off-hook message has been transmitted, interrupt service routine 212 disables the transmit interrupt in the control register of PC bus interface 334. CPU 330 then transmits the S2 channel off-hook message to HDLC device 315 via CPU address, control and data bus 203. Switch DLI 310 reads the S2 channel control message from HDLC device 315, formats this control message into a DCP message frame and transmits the resultant DCP message frame to the business communication system over communication leads TR51.

Data Call Dialing

The business communication system responds to the S2 channel off-hook message by returning an S2 channel dial tone message with the test "Dial:" to DCP interface card 201 in the DCP message frames. This S2 channel dial tone message is routed by switch DLI 310 to HDLC device 315 where it is stored for retrieval by CPU 330. CPU 330 retrieves the S2 channel dial tone message and appends the appropriate address header and message length bytes before generating an interrupt via PC Bus interface 334 for interrupt service routine 212. Interrupt service routine 212 reads the S2 channel dial tone message via interrupts and direct memory access and responds to the S2 channel dial tone message by manipulating the called party identification number as received from application interface 213 into a format acceptable by the business communication system. Interrupt service routine 212 updates dialing status to application interface 213 via interprocess control path 214 for communication management application 210 to read. Interrupt service routine 212 transmits to CPU 330 this dial string in ASCII format at the rate of 5 digits per S2 channel message and, at the end of the dial stream, interrupt service routine 212 appends a carriage return character. CPU 330 forwards the received S2 channel message via HDLC device 315 and switch DLI 310 over the S2 channel of the DCP message frames to the business communication system.

When the business communication system receives the carriage return character appended to the end of the dial stream by interrupt service routine 212, the business communication system rings the called party and transmits an S2 channel ring back tone message with the test "Ringing" to DCP interface card 201. This received S2 channel ring back tone message frame is routed by switch DLI 310 to HDLC device 315 where it is retrieved by CPU 330. CPU 330 appends the appropriate address header and message length bytes to the S2 channel ring back tone message and forwards the resultant message to interrupt service routine 212. Interrupt service routine 212 updates dialing status to application interface 213 via interprocess control path 214 for communication management application 210 to read. Communication management application 210 reads the dialing status from application interface 213 and displays the text "Ringing" on the display of PC51.

Data Call Completion

The call remains in the ringing state until the called destination goes off-hook, at which time the business communication system transmits an S2 channel ring back removed tone message with the text "Answered" to DCP interface card 201. This message indicates that the called party has answered the data call. This S2 channel ring back remove tone message is routed by switch DLI 310 to HDLC device 315 for retrieval by CPU 330. CPU 330 appends the address header and message length bytes to this control message and forwards same to interrupt service routine 212. Interrupt service routine 212 updates dialing status to application interface 213 via interprocess control path 214 for communication management application 210 to read. Communication management application 210 reads status via application interface 213 and displays "Answered" test to the user. In response to the received S2 channel ring back remove tone message, interrupt service routine 212 transmits a control message to CPU 330 to initiate the appropriate data protocol code (which is selected by the baud rate) on DCP interface card 201. The data protocol code runs on CPU 330, terminates levels 2 and 3 of the data protocol and provides a data interface between serial HDLC device 315 and interrupt service routine 212.

The data protocol code will handshake with the remote data module on the I2 channel by sending and receiving control messages via 314, 311, and 310. When the data protocol code of DCP interface board 201 and that of the remote data module determine that they are compatible, CPU 330 transmits a control message to interrupt service routine 212 indicating that the call setup was successful and interrupt service routine 212 responds by transmitting and S2 channel handshake success message to the business communication system. Interrupt service routine 212 transmits the S2 channel handshake success message to CPU 330 for formatting and transmission to the business communication system via HDLC device 315 and switch DLI 310. Interrupt service routine 212 also transmits the control message received from DCPI via application interface 213 to communication management application 210. In response to this received message, communication management application 210 updates the screen on PC51 to "active".

One example of a data transfer situation is where communication management application 210 is used for terminal emulation purposes. In this case, the user at PC51 enters data from the keyboard of PC51 and communication management application 210 transmits the data through application interface 213 and interrupt service routine 212 (which appends the address header and message length bytes) to the data protocol code which resides on CPU 330. The data protocol code transmits only the data using the appropriate framing on the I2 channel to the remote data module via HDLC device 314 and switch DLI 310. Data is received on communication leads TR51 from the remote module and is routed by switch DLI 310 to HDL device 314. This I2 channel data is read by CPU 330 via CPU address, control and data bus 203. CPU 330 forwards this received data with address header and message length bytes to interrupt service routine 212 which passes only the data via application interface 213 to communication managment application 210. The data received by communication management application 210 is either displayed for the user on the screen of PC51 or stored in a file in memory 208.

Data Call Disconnect

At the end of the call, the user at PC51 requests a disconnect. Communication management application 210 responds to the user's disconnect signal by transmitting a disconnect control message to application interface 213 requesting a disconnect. Application interface 213 transmits a control message through interrupt service routine 212 to CPU 330 to terminate the data protocol code. CPU 330 returns a control message to interrupt service routine 212 to indicate that the data protocol code is terminated. Interrupt service routine 212 responds to the data protocol code terminated message by transmitting an S2 channel on-hook message to the business communication system via CPU 330, HDLC device 315 and switch DLI 310. Interrupt service routine 212 then returns to the idle state.

For mnemonic and directory dialing, communication management application 210 replaces the keyboard input from the user in mnemonic or directory form with a dial string and then proceeds as discussed above with respect to the case of keyboard dialing.

Incoming Calls to PC51

Incoming calls to PC51 are processed in similar fashion to outgoing calls as described above. The business communication system on an incoming voice call transmits the following messages to DCP interface card 201: an S1 channel ringer on message; an S1 channel display message with calling party identification; and S1 channel lamp update message. These messages are carried as part of the HDLC message frames on communication leads TR51 to switch DLI 310 where they are routed to HDLC device 315. CPU 330 sequentially retrieves these messages from HDLC device 315 via CPU address, control and data bus 203. CPU 330 appends address header and mesage length bytes to each message then generates an interrupt to interrupt service routine 212 via PC Bus interface 334. Interrupt service routine 212 reads the message via interrupts and direct memory access and stores each received message sequentially in memory 208. Communication management application 210 retrieves these messages in sequential fashion by periodically polling application interface 213 which retrieves the messages from memory 208. Communication management application 210 responds to each message so received by updating the screen of PC51 and simultaneously forwarding the message to adjunct telephone station set T51. Communication management application 210 routes the message via application interface 213, interrupt service routine 212 to CPU 330. CPU 330 responds to each message forwarded by communication management application 210 by determining the identity of the destination for this message, in this case adjunct telephone station set T51, and forwards the S2 channel message via CPU address control and data bus 203 to HDLC device 325. Phone DLI 320 retrieves the S1 channel messages stored in HDLC device 325 and formats these messages into a DCP frame and transmits same to the adjunct telephone station set T51. Adjunct telephone station set T51 responds to the S1 channel ringer on message by generating an alerting tone to indicate to the user at PC51 that an incoming call has arrived. In addition, the S2 channel display message of a calling party ID causes adjunct telephone station set T51, if equipped with a display, to indicate the identity of the party calling the user at adjunct telephone station set T51. The S1 channel lamp update message causes adjunct telephone station set T51 to light the appropriate call indication. The user at PC51 can answer this call by picking up the handset on adjunct telephone station set T51. This action causes adjunct telephone station set T51 to transmit an S2 channel off-hook message to phone DLI 320 which routes this control message to HDLC device 325. CPU 330 retrieves the S2 channel off-hook message via CPU address, control and data bus 203, appends the appropriate header and message length bytes to this message and forwards the resultant control message to interrupt service routine 212 via PC Bus interface 334. Interrupt service routine 212 responds to the received S1 channel off-hook message from adjunct telephone station set T51 by storing the off-hook message in memory 208 for communication management application 210 to read via application interface 213 and forwarding this S1 channel off-hook message to the business communication system. Interrupt service routine 212 transmits the S1 channel off-hook message with the appropriate header and message length bytes to CPU 330 via PC Bus interface 334. CPU 330 decodes the header portion of this message to determine the destination for this control message. CPU 330 forwards the message via CPU address, control and data bus 203 to HDLC device 325. Switch DLI 310 retrieves the S1 channel offhook message from HDLC device 315 and formats this message into a DCP frame and transmits the resultant frame to the business communication system over communication leads TR51 to indicate to the business communication system that the user at adjunct telephone station set T51 has gone off-hook. The conversation between the user at adjunct telephone station set T51 and the originating party continues until one of the parties goes on-hook at which time the call is terminated as discussed above for the case of the call originated by PC51.

Incoming data calls to PC51 are similar in operation to an incoming voice call described above. For an incoming data call, the business communication system transmits an S2 channel ringer on message to DCP interface board 201. Switch DLI 310 routes the S2 channel ringer on message to HDLC device 315 where it is stored for retrieval by CPU 330. CPU 330 appends the appropriate header and message length bytes to this received S2 channel ringer on message and forwards the resultant message frame to interrupt service routine 212 by way of PC Bus interface 334. If the user has specified in the communication management application 210 that auto answer is on, this status information is passed by communication management application 210 to interrupt service routine 212 via application interface 213 and interprocess communication path 214. Interrupt service routine 212 automatically answers the call by transmitting an S2 channel off-hook message to the business communication system. Interrupt service routine 212 transmits the S2 channel off-hook message with the appropriate header and message length bytes to CPU 330. CPU 330 decodes the header portion of this message to determine the destination to which this message is intended and forwards the control message over CPU address, control and data bus 203 to HDLC device 315. Switch DLI 310 retrieves the S2 channel off-hook message from HDL device 315 and formats this message into a DCP message frame and forwards the frame to the business communication system over communication leads TR51. The business communication system responds to the received S2 channel off-hook message by transmitting an S2 channel ringer off message with the test "Answered" to DCP interface card 201. Switch DLI 310 routes this S2 channel ringer off message to HDLC device 315 where it is retrieved by CPU 330. CPU 330 appends the appropriate header and message length bytes to this S2 channel ringer off message and forwards the resultant message frame to interrupt service routine 212 by way of PC Bus interface 334. Interrupt service routine 212 responds to the received S2 channel ringer off message from the business communication system by automatically sending a control message to CPU 330 to initialize the data protocol code. The remaining portion of the coil setup sequence is as described above for a data call originated at PC51. When the connection is complete, the data communication between source and destination continues until one party terminates the call at which time the call is broken down as described above for a data call originated by PC51.

Calls To and From Adjunct Telephone Station Set

The processing of originating voice and data calls from adjunct telephone station set T51 is similar to voice and data calls originated from PC51. The only significant difference is that data calls can be originated only when bypass switches 301 are in the direct connect mode and also that the originating stimulus is generated by adjunct telephone station set T51 and routed by phone DLI 320 to HDLC device 325 where it is stored for retrieval by CPU 330. CPU 330 appends the appropriate header and message count bytes to these call origination messages then forwards them to interrupt service routine 212. Interrupt service routine 212 forwards the received S1 channel (for voice originated calls) control messages to memory 208 and application interface 213 for communication management application 210. Communication management application 210 updates the screen on PC51 to indicate the call origination status of adjunct telephone station set T51. The processing of the remainder of this originated call is identical to that described above for calls originated from PC51.

Incoming voice or data calls to adjunct telephone station set T51 are processed identically to incoming calls for PC51 as described above. The only difference is that data calls can be received only when bypass switches 301 are in the direct connect mode between the business communication system and the adjunct telephone station set T51.

SUMMARY

It is obvious from the above description that PC51 has access to the S1 and S2 channel control messages between adjunct telephone station set T51 and the business communication system. The communication management application 210 described above is a simple message handling process which can be supplemented by application software running on processsor 209. This application software can provide additional features and services by responding in more substantive fashion to the S channel messages received by communication management application 210. In this fashion, the application process can modify the content of the S1 and S2 channel messages between the business communication system and adjunct telephone station set T51 rather than simply forwarding these messages.

While a specific embodiment of the invention has been disclosed, variations, in structural detail, within the contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a communication system having a plurality of port circuits, each of which is connected to a corresponding terminal device and communicates with said corresponding terminal device according to a predetermined protocol, an interface apparatus associated with at least one of said terminal devices and comprising:

processing means;

means interposed between said at least one terminal device and its corresponding port circuit for terminating communication signals passing between said at least one terminal device and said port circuit and also connected to said processing means for connecting said processing means to both said port circuit and said at least one terminal device; and wherein said processing means is responsive to receipt of said communication signals from said port circuit or said at least one terminal device, for determining from said received communication signals a service to be provided and for communicating with said port circuit or terminal device according to said protocol to provide said service.

2. The apparatus of claim 1 wherein said processing means includes:

means responsive to voice communication signals received from said port circuit from transmitting said voice communication signals as originally received to said terminal device.

3. The apparatus of claim 1 wherein said processing means includes:

means responsive to voice communication signals received from said terminal device for transmitting said voice communication signals as originally received to said port circuit.

4. The apparatus of claim 1 wherein said processing means includes:

means responsive to call control signals received from said port circuit for forwarding control signals to said terminal device to perform a call control function corresponding to said call control signals.

5. The apparatus of claim 4 wherein said processing means further includes:

means responsive to said call control signals for writing a control message corresponding to said call control signals on a video monitor associated with said processing means.

6. The apparatus of claim 4 wherein said processing means further includes:
means responsive to said call control signals from transmitting a response set of control communication signals to said port circuit indicating receipt of said call control signals.

7. The apparatus of claim 1 wherein said processing means includes:
means responsive to service request control signals received from said terminal device for forwarding service request communication signals to said port circuit.

8. The apparatus of claim 7 wherein said processing means further includes:
means responsive to said service request control signals for writing a control message corresponding to said service request control signals on a video monitor associated with said processing means.

9. The apparatus of claim 1 wherein said processing means includes:
means responsive to the entry of a called party identification number on a keyboard of said processing means for forwarding off-hook service request communication signals to said port circuit.

10. The apparatus of claim 9 wherein said connecting means includes:
means responsive to said called party identification number for applying tone dialing signals corresponding to said called party identification number to said port circuit.

11. The apparatus of claim 1 wherein said connecting means includes:
means for detecting transmission of call progress tone signals from said port circuit to said terminal device; and
means responsive to said detected call progress tone signals for sending a control message identifying said detected call progress tone signals to said processing means.

12. The system of claim 1 wherein said terminated communication signals are communication control signals.

13. The system of claim 1 wherein said terminated communication signals are concurrent voice and data communication signals.

14. The system of claim 1 further comprising means responsive to failure of said processing means for causing said terminating and connecting means to pass-through said communication signals.

15. The system of claim 1 further comprising means responsive to failure of said processing means to communicate with said port circuit or said terminal device for causing said terminating and connecting means to cease terminating said communication signals and to pass-through said communication signals.

16. A communication management arrangement for connecting a terminal device to a communication line, said terminal device communicating across said communication line according to a predetermined protocol, comprising:
means connected to both said terminal device and said communication line for terminating communication signals output by said terminal device and said communication line; and
means connected to said terminating means and responsive to said communication signals received from said terminal device or said communication line for determining from said communication signals a service to be provided and communicating with said terminal device or said communication line according to said protocol to provide said service.

17. The apparatus of claim 16 wherein said terminating means includes:
means responsive to voice communication signals received from said communication line for transmitting said voice communication signals as originally received to said terminal device.

18. The apparatus of claim 16 wherein said terminating means includes:
means responsive to voice communication signals received from said terminal device for transmitting said voice communication signals as originally received to said communication line.

19. The apparatus of claim 16 wherein said determining and communicating means includes:
means responsive to call control signals received from said communication line for forwarding control signals to said terminal device to perform a call control function corresponding to said call control signals.

20. The apparatus of claim 19 wherein said determining and communicating means further includes:
means responsive to said call control signals for writing a control message corresponding to said call control signals on a video monitor associated with said determining and communicating means.

21. The apparatus of claim 19 wherein said determining and communicating means further includes:
means responsive to said call control signals for transmitting a response set of control communication signals to said communication line indicating receipt of said call control signals.

22. The apparatus of claim 16 wherein said determining and communicating means includes:
means responsive to service request control signals received from said terminal device for forwarding service request communication signals to said communication line.

23. The apparatus of claim 22 wherein said determining and communicating means further includes:
means responsive to said service request control signals for a control message corresponding to said service request control signals on a video monitor associated with said determining and communicating means.

24. The apparatus of claim 16 wherein said determining and communicating means includes:
means responsive to the entry of a called party identification number on a keyboard of said determining and communicating means for forwarding off-hook service request communication signals to said communication line.

25. The apparatus of claim 24 wherein said terminating means includes:
means responsive to said called party identification numberfor applying tone dialing signals corresponding to said called party identification number to said communication line.

26. The apparatus fo claim 16 wherein said terminating means includes:
means for detecting the transmission of call progress tone signals from said communication line to said terminal device ; and
means responsive to said detected call progress tone signals for sending a control message identifying said detected call progress tone signals to said determining and communicating means.

27. The system of claim 16 wherein said terminated communication signals are communication control signals.

28. The system of claim 16 wherein said terminated communication signals are concurrent voice and data communication signals.

29. The system of claim 16 further comprising means responsive to failure of said determining and communicating means for causing said terminating means to pass-through said communication signals.

30. The system of claim 16 further comprising means responsive to failure of said determining and communicating means to communicate with said communication line or said terminal device for causing said terminating means to cease terminating said communication signals and to pass-through said communication signals.

31. A communication management arrangement serving a terminal device and a communication line associated with said terminal device, said terminal device communicating with said communication line according to a predetermined protocol, comprising:
means interposed between said terminal device and said associated communication line for terminating all communication control signals output by both of said terminal device and said associated communication line;
means, responsive to said terminated communication signals, for determining from said communication signals a communication service to be provided and generating control signals according to a predefined algorithm to provide said communication service; and
means responsive to said generated control signals for transmitting said generated control signals according to said protocol to either said terminal device or said communication line as determined by said algorithm to perform function specified by said generated control signals.

32. The apparatus of claim 31 wherein said determining and generating means includes;
means responsive to voice communication signals received from said communication line for transmitting said voice communication signals as originally received to said terminal device.

33. The apparatus of claim 31 wherein said determining and generating means includes:
means responsive to voice communication signals received from said terminal device for transmitting said voice communication signals received from said terminal device for transmitting said voice communication signals as originally received to said communication line.

34. The apparatus of claim 31 wherein:
said determining and generating means are responsive to call control signals received from said communication line for forwarding control signals to said terminal device to perform a call control function corresponding to said call control signals.

35. The apparatus of claim 34 wherein:
said determining and generating means are additionally responsive to said call control signals for writing a control message corresponding to said signal for writing a control message correspondong to said call control signals on a video monitor associated with said determining and generating means.

36. The apparatus of claim 34 wherein:
said transmitting means are responsive to said call control signals for transmitting a response set of control communication signals to said communication line indicating receipt of said call control signals.

37. The system of claim 31 wherein said terminated communication control signals are concurrent voice and data communication control signals.

38. The system of claim 31 further comprising means reponsive to failure of said determining and generating means for causing said terminating means to pass-through the communication control signals.

39. The system of claim 31 further comprising means responsive to failure of said determining and generates means to communicate with said communication line or said terminal device for causing said terminating means to ceause terminating said communication control signals and to pass through they communication control signals.

* * * * *